W. F. DAVIS.
CAR MOTOR.
APPLICATION FILED OCT. 10, 1905.
1,077,679.
Patented Nov. 4, 1913.
5 SHEETS—SHEET 1.
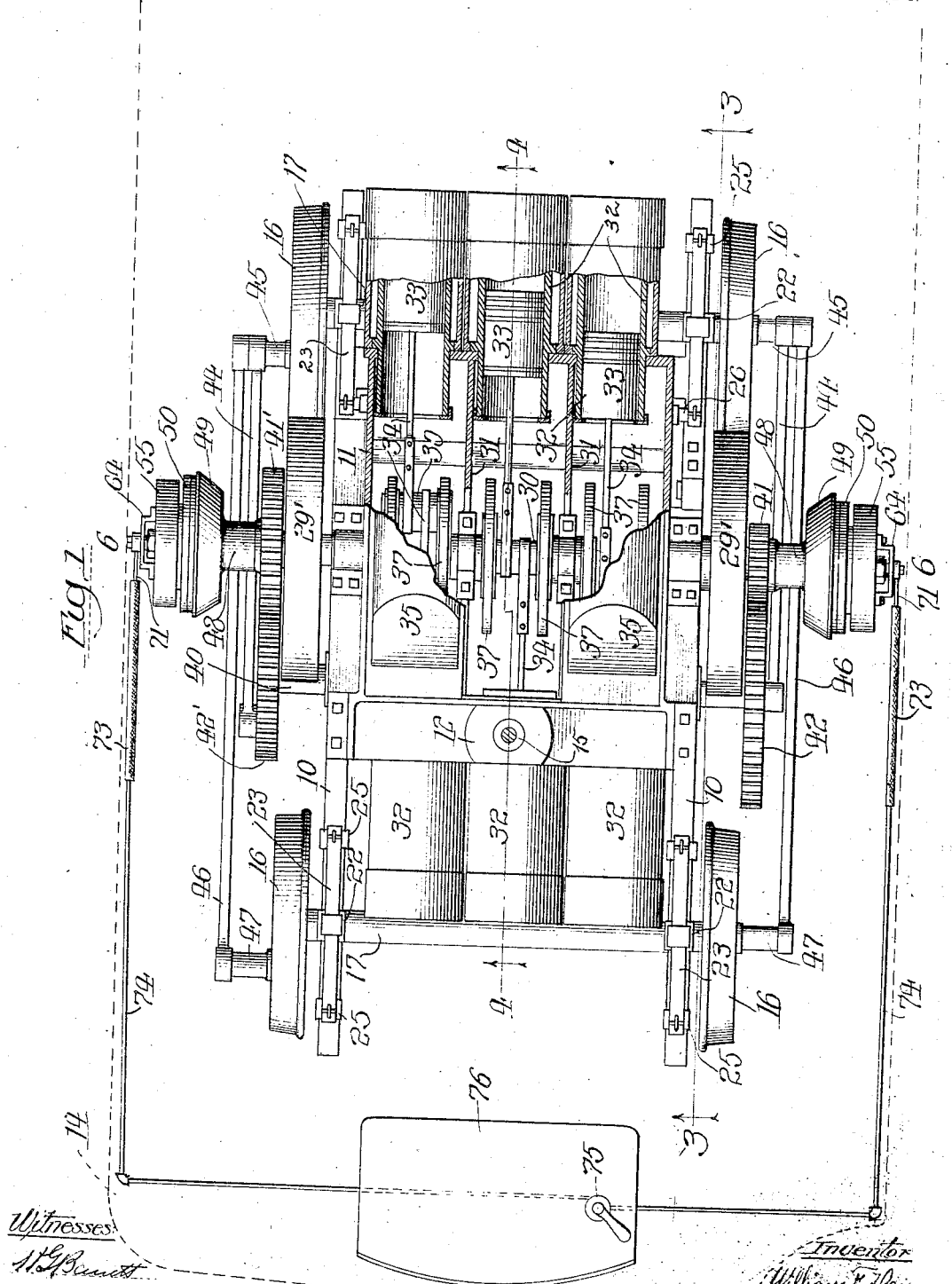

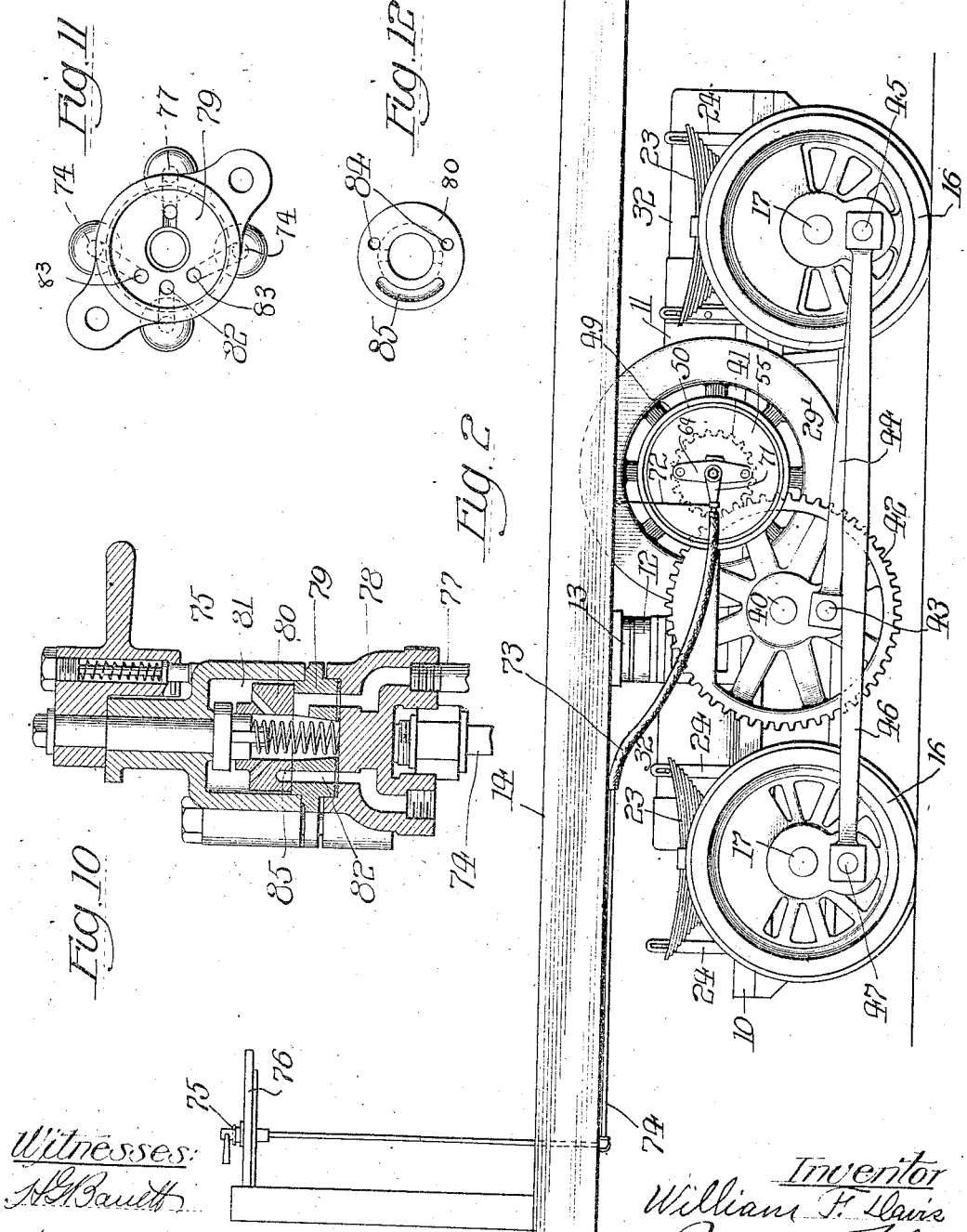

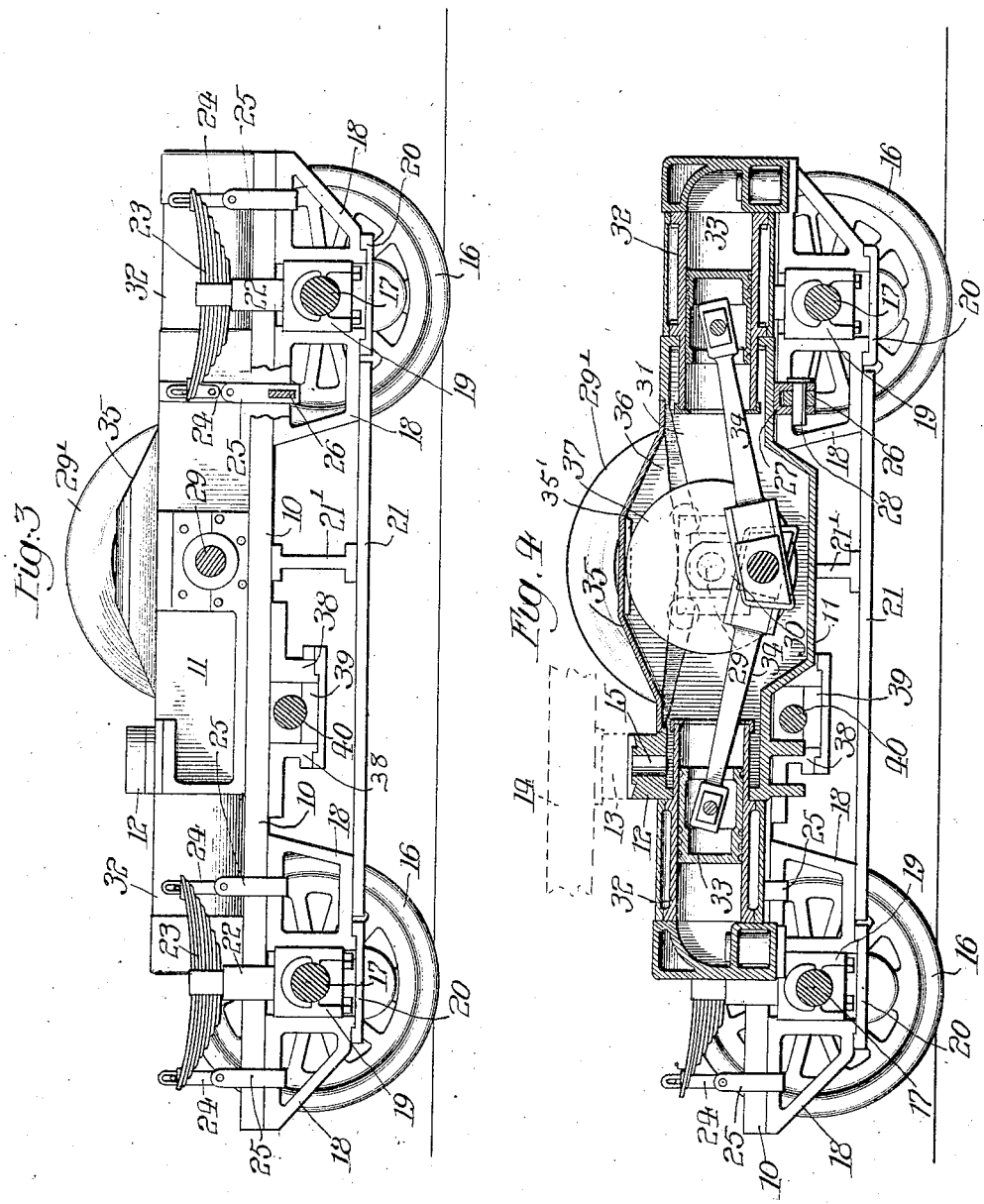

W. F. DAVIS.
CAR MOTOR.
APPLICATION FILED OCT. 10, 1905.
1,077,679.
Patented Nov. 4, 1913.
5 SHEETS—SHEET 4.
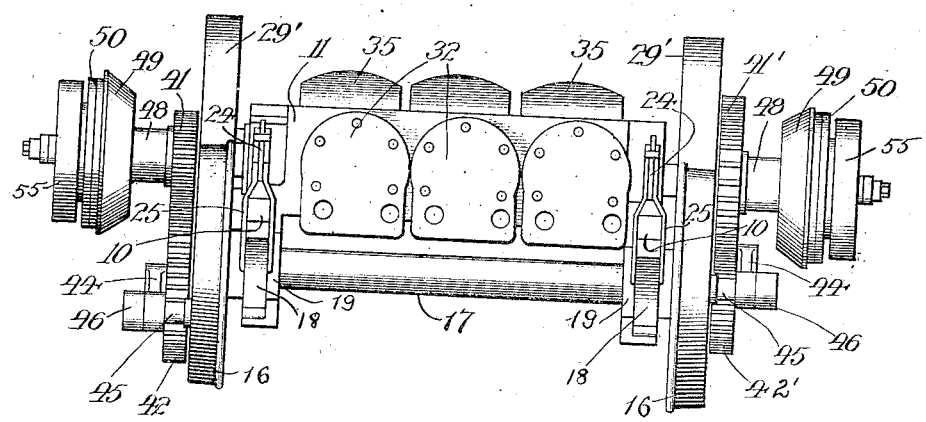
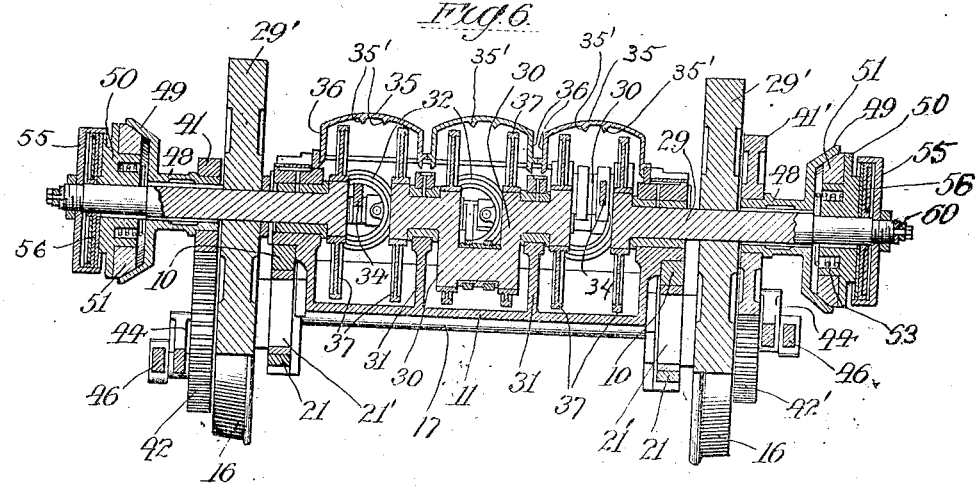

W. F. DAVIS.
CAR MOTOR.
APPLICATION FILED OCT. 10, 1905.
1,077,679.
Patented Nov. 4, 1913.
5 SHEETS—SHEET 5.
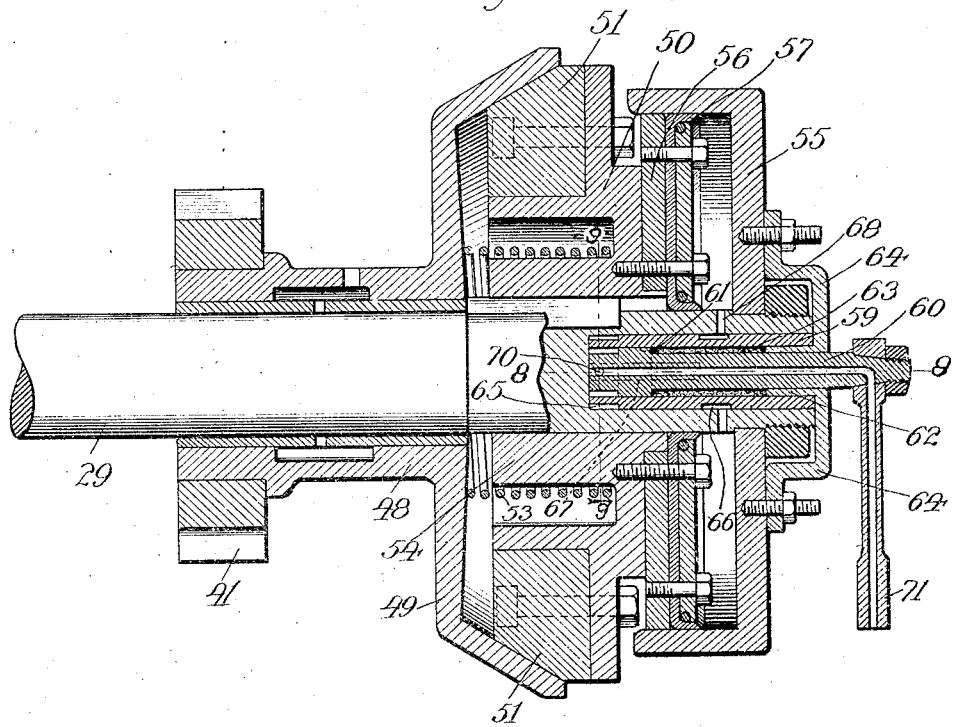
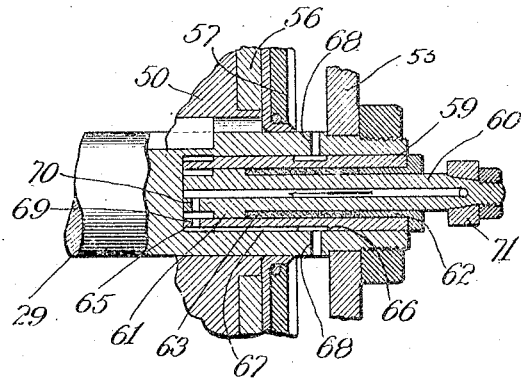
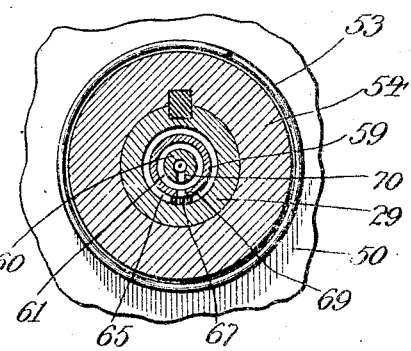
Witnesses:
Inventor:
William F. Davis
by Peirce & Fisher
Attorneys

UNITED STATES PATENT OFFICE.

WILLIAM F. DAVIS, OF KANSAS CITY, KANSAS, ASSIGNOR TO McKEEN MOTOR CAR COMPANY, A CORPORATION.

CAR-MOTOR.

1,077,679.

Specification of Letters Patent.   Patented Nov. 4, 1913.

Application filed October 10, 1905. Serial No. 282,154.

*To all whom it may concern:*

Be it known that I, WILLIAM F. DAVIS, a citizen of the United States, and a resident of Kansas City, county of Wyandotte, and State of Kansas, have invented certain new and useful Improvements in Car-Motors, of which the following is declared to be a full, clear, and exact description.

The invention relates to motors for cars and the like and to the manner of mounting and arranging the same and to the connections of the motor with the car wheels, and is designed to cover and claim, among others, certain features illustrated and more or less fully set forth in my companion application, Serial No. 282,153, of even date herewith.

The invention seeks to provide a convenient arrangement in which the motor which is of the explosive, internal combustion type, is mounted upon the truck of the car and is suitably connected to the wheels of the truck and is particularly designed to provide a motor upon the bogie truck of a street or railway car.

With these objects in view the invention consists in the features of construction, combinations and arrangements of parts hereinafter described, illustrated in the accompanying drawings and more particularly pointed out in the appended claims.

In the drawings, Figure 1 is a plan view of the improved car motor, the body of the car being shown in dotted lines. Fig. 2 is a side elevation of one end of the car showing the motor applied thereto. Figs. 3 and 4 are longitudinal sections on lines 3—3 and 4—4 respectively of Fig. 1. Fig. 5 is an end view. Fig. 6 is a cross section on the line 6—6 of Fig. 1. Fig. 7 is an enlarged sectional view of the clutch. Figs. 8 and 9 are detail sectional views taken on lines 8—8 and 9—9 respectively of Fig. 1. Fig. 10 is a sectional view of the clutch controlling valve. Fig. 11 is a plan view of the valve seat. Fig. 12 is an inverted plan view of the valve.

The car truck comprises the side bars 10 connected by a heavy casting 11. This casting is preferably in the form of a hollow crank casing and at its forward end is provided with a bolster 12. A bolster 13 fixed to the car body 14, is swiveled to the bolster 12 of the truck by a king bolt 15 (see Fig. 4).

The bogie truck is carried upon two pairs of wheels 16 fixed to the axles 17. Brackets 18 fixed to and depending from the side bars 10 of the truck, form guides upon which the axle boxes 19 are vertically shiftable. Each pair of brackets is connected at their lower ends by a bridge piece 20 and the inner brackets on each side of the truck are connected together by a longitudinally extending brace-bar 21. A center post 21' connects the side bars 10 and 21. A saddle 22 rises from each of the axle boxes 19 and is connected to the central portion of a series of leaf springs 23. The truck is hung from the ends of these springs by links 24 that are connected to straps 25 extending around the side bars 10 and brackets 18, as shown in Fig. 3. The forward ends of the rear springs 23 are however, connected by the links 24 to the ends of an equalizing bar 26 (see Figs. 3 and 4). Bar 26 is centrally connected to a U-shaped lug 27 on the under side of the casting 11 by a bolt 28. By this arrangement the truck is spring-supported from the wheel axles.

The main power shaft 29 is mounted within the crank casing 11 and is provided with a plurality of cranks 30 and two fly wheels 29'. In the form shown there are three of these cranks set at 120 degrees apart. The main journal boxes for the crank shaft are mounted within the ends of the crank casing 11 just above the side bars 10 of the truck. Supplemental bearings for the power shaft are carried upon longitudinally extending ribs 31 within the crank casing (see Fig. 6). The horizontal power cylinders 32, of which six are employed in the form shown, three on each side of the power shaft, extend within openings in the end of the crank casing and are securely bolted thereto, as shown in Fig. 4. The single acting pistons 33 within the power cylinders are connected by pitman rods 34 to the cranks 30. The power cylinders that are directly opposite each other on opposite sides of the shaft, are connected to the same crank.

The details of the admission and exhaust valves and igniters, and their actuating mechanism, may vary, any usual or suitable construction being adopted. As these constitute no part of the present invention and are well known, it is deemed unnecessary to illustrate or describe the same.

The upper portion of the crank casing is closed by a set of three cover plates 35 (see Figs. 4 and 6) having raised central portions with beveled ribs 35' and depending side flanges 36 having beveled lower edges which extend downwardly closely adjacent the upper edges of the sides of the longitudinal ribs having grooves to conduct the oil. The lower portion of the crank casing extends downwardly, as shown, and is adapted to contain oil. A series of disks 37 having rectangular openings, as indicated in Fig. 4, sit over the cranks 30 and serve to distribute the oil over the bearings of the engine shaft and over the bearings at the ends of the pitman rods 34. They also serve to lubricate the cylinders so that all moving parts of the engine are automatically lubricated. This is an important feature, since the engine is located on the truck beneath the car body and is quite inaccessible for oiling in the ordinary manner.

Brackets 38 depending from and secured to the side bars 10 of the truck, carry the journal boxes 39 of a transverse counter shaft 40. Two sets of gears 41 and 42 and 41' and 42' are mounted upon the ends of the main and counter shafts. The gears 42 and 42' are fixed to the ends of the counter shaft and provided with eccentric or crank pins 43 (see Fig. 2) that are connected by pitman rods 44 to the eccentric or crank pins 45 on the rear pair of truck wheels. Connecting rods 46 connect the crank pins 45 with the eccentric or crank pins 47 on the forward pair of truck wheels. This mode of construction permits the free up and down movement of the truck wheels without interfering with the proper operation of the engine shaft and pistons connected thereto.

The two sets of gears are of different sizes and the gears 41 and 41' are fixed to the inner ends of sleeves 48 (see Figs. 6 and 7) that are loosely mounted upon the ends of the main power shaft. Cupped shaped clutch disks 49 are fixed to the upper ends of the sleeves 48 or, as shown, are cast in piece therewith. Releasable clutch members 50 are splined to the shaft so as to be shiftable longitudinally thereon and are provided with blocks 51 of wood arranged to frictionally engage the clutch disks 49 when the clutch members 50 are shifted toward the same.

The clutch disk 50 is arranged to be held away from the disk by a spring 53 coiled about the hub 54 of the clutch member 50, and extending between the inner face thereof and the inner face of the clutch disk. A short cylinder 55 is fixed to the end of the power shaft 29 and a piston 56 having a flanged packing ring 57 is arranged within the cylinder and is connected to the releasable clutch member 50. The end of the shaft is cored out, as shown, and a sleeve or bushing 59 is fitted therein. A hollow spindle 60 sets within the sleeve 59 and is provided with a shouldered portion 61 fitting the bore of the sleeve. A gland 62 sets within the sleeve about the spindle, and holds the packing 63 in place. The gland 62 (see Fig. 7) is formed upon a cross-bar 64 secured to the cylinder 55. The sleeve 59 is provided with two annular channels 65 and 66 that are in communication with each other through a longitudinally extending passage 67 (see Fig. 8). The annular channel 66 is placed in communication with the interior of the cylinder 65 by ports 68 extending through the shaft 29. The annular channel 65 at the inner end of the sleeve 59, is in communication with the bore of the hollow spindle 60 through ports 69 and 70 formed in the sleeve 59 and in the inner end of the spindle.

A short pipe section 71 is fixed to the conical outer end of the spindle 60 and is held against rotary movement by a flexible brace 72 connected to the bottom of the car, as shown in Fig. 2. The pipe sections 71 on either side of the car, are connected by flexible pipe sections 73 (see Figs. 1 and 2) with pipes 74 that lead to a controlling valve 75. This valve is mounted upon a suitable horizontal supporting plate 76 in the front vestibule of the car and within easy reach of the motorman. Any suitable form of multiway valve may be employed for connecting the clutch operating fluid pressure device at either end of the main shaft to a source of air or other suitable fluid under pressure, but the valve should be so arranged that when one of the fluid pressure devices is connected to the source of supply, the other is connected to the exhaust and so that both may be connected to the exhaust. In this way, both of the clutches may be held out of operation or either one may be thrown into operation and the counter shaft driven from the power shaft at different rates of speed and with different power. In the form of valve shown in the drawings (see Figs. 10, 11 and 12), the air from the supply pipe 77 is led upwardly by suitable ports through the bottom portion 78 of the valve casing, through the valve seat 79 and through the disk valve 80 into the upper portion 81 of the valve casing. The valve seat 79 and the bottom portion 78 are provided with a suitable exhaust port 82 and with ports 83 communicating with the pipe 74 leading to the clutch operating devices. The disk valve is provided with admission ports 84 extending therethrough and with a segmental exhaust channel 85 on its side. These ports and exhaust channels are so arranged that one of the admission ports 84 may be placed in communication with the corresponding port 83 leading to one of the clutch actuating devices, while the other port 83 from the other fluid pressure device is in communication with the exhaust port 82 through the channel 85 of the valve. Or both ports 83 may be placed in connection with the exhaust but cannot both be placed in communication with the supply. In this way either one of the clutches may be thrown into operation while the other is necessarily in inoperative position.

It is obvious that numerous changes may be made in the details of construction and arrangement of parts without departing from the essentials of the invention, as set forth in the claims.

Having described my invention, what I claim as new and desire to secure by Letters Patent, is:—

1. In car motors, the combination with the bogie truck and car body swiveled thereon, of two pairs of wheels whereon said truck is spring-supported, a shaft journaled on the truck, pitman rods connecting said shaft and one pair of wheels, an internal combustion engine mounted on the truck, connections between the engine and said shaft, and a friction clutch interposed in said connections.

2. In car motors, the combination with the bogie truck and car body swiveled thereon, of two pairs of wheels whereon said truck is spring-supported, a shaft journaled on the truck, driving means connecting said shaft and one pair of wheels, an internal combustion engine mounted on the truck, connections between the engine and said shaft, a friction clutch interposed in said connections, and fluid pressure devices for actuating said clutch.

3. In car motors, the combination with the bogie truck and car body swiveled thereon, of two pairs of wheels whereon said truck is spring-supported, a shaft journaled on the truck, driving means connecting said shaft and one pair of wheels, an internal combustion engine mounted on the truck, connections between the engine and said shaft, a friction clutch in said connections, fluid pressure devices for actuating said clutch, a controlling valve in the car body, and flexible pipe connections between said valve and the fluid pressure device.

4. In car motors, the combination with the bogie truck and car body swiveled thereon, of wheels whereon said truck is spring-supported, a counter shaft and a crank shaft journaled on the truck, driving means connecting said counter shaft and the truck wheels, gears connecting said crank and counter shafts, and internal combustion engines mounted on the truck and connected to said crank shaft.

5. In car motors, the combination with the bogie truck and car body swiveled thereon, of wheels whereon said truck is spring-supported, a counter shaft and a crank shaft journaled on the truck, driving means connecting said counter shaft and the truck wheels, gears connecting said crank and counter shafts, a friction clutch coöperating with one of said gears, a fluid pressure device for actuating said clutch, a valve on the car body, flexible pipe connection between said valve and said fluid pressure device, and internal combustion engines mounted on the truck and connected to said crank shaft.

6. In car motors, the combination with the bogie truck and car body swiveled thereon, of wheels whereon said truck is spring-supported, a counter shaft and a crank shaft journaled on the truck, driving means connecting said counter shaft and the truck wheels, two sets of gears of different sizes for connecting said crank and counter shafts, friction clutches coöperating with said sets of gears, fluid pressure devices for actuating said clutches, a controlling valve on the car body adapted to actuate said clutches to drive said counter shaft at different speeds, flexible pipe connections between said valve and said fluid pressure devices, and internal combustion engines mounted on the truck and connected to said crank shaft.

7. In car motors, the combination with the bogie truck and car body swiveled thereon, of a motor of the explosion type mounted on the truck; connections, including a friction clutch, between said motor and the truck wheels; a fluid pressure device mounted on the truck for operating the clutch; a source of pressure fluid; a pipe connection between said source and said fluid pressure device, independent of the supply piping of the engine, and including a flexible portion; and a valve located on the car body for controlling the delivery of pressure fluid to said fluid pressure device.

8. In car motors, the combination with the bogie truck and the car body swiveled thereon, of a shaft journaled on the truck; an explosion engine mounted on the truck and connected to said shaft; connections between said shaft and the wheels of the truck, including two sets of gears of different speed ratios; friction clutches coöperating with each set of gears; fluid pressure devices for actuating said clutches; a controlling valve on the car body adapted to control said clutches to drive said shaft at different speeds; and pipe connections, including a flexible portion, between the valve and said fluid pressure devices.

9. In car motors, the combination with the truck, of two pairs of truck wheels, supporting springs between said wheels and said truck, an engine crank shaft and a counter shaft journaled on the truck, an internal combustion engine mounted on the truck and connected to said crank shaft, driving means connecting said counter shaft and one pair of wheels, and connecting gear including a friction clutch between said engine and said counter shafts.

10. In car motors, the combination with the truck, of two pairs of truck wheels, supporting springs between said wheels and said truck, an engine crank shaft and a counter shaft journaled on the truck, an internal combustion engine mounted on the truck and connected to said crank shaft, driving means connecting said counter shaft and one pair of wheels, two sets of gears between said engine and counter shafts, friction clutches coöperating with said sets of gears, and means for actuating said clutches, whereby said counter shaft may be driven through either set of gears.

11. In car motors, the combination with the truck, of two pairs of truck wheels, supporting springs between said wheels and said truck, an engine crank shaft and a counter shaft journaled on the truck, an internal combustion engine mounted on the truck and connected to said crank shaft, driving means connecting said counter shaft and one pair of wheels, two sets of gears between said engine and counter shafts, friction clutches coöperating with said sets of gears, fluid pressure actuating devices for said clutches, and a valve controlling the admission and exhaust from said fluid pressure devices, whereby either of said clutches may be thrown into operative position, or both thereof be held immovable.

12. In car motors, the combination with a car truck, and with two pairs of wheels whereon the truck is spring-supported, of a counter shaft journaled on the truck, driving means connecting the counter shaft and one pair of wheels, a transverse engine shaft, gear connections between said engine shaft and said counter shaft, a friction clutch coöperating with said gear connections, and an engine comprising a series of single acting, horizontal power cylinders mounted on opposite ends of the truck and connected to said engine shaft.

13. In car motors, the combination of the truck comprising side bars, an inclosed crank casing mounted on said side bars, a crank shaft journaled in said casing, connections between said shaft and the wheels of the truck, an engine comprising two sets of horizontal, single acting power cylinders secured to the opposite ends of said crank casing, pistons in said cylinders, pitmen connecting said pistons with said shaft, and a plurality of oiling disks mounted on said shaft.

14. In car motors, the combination with the car body, of a bogie truck whereon the car is swiveled, comprising a pair of side bars, an inclosed crank casing mounted upon and extending between said bars, a counter shaft journaled on the truck, two pairs of wheels whereon the truck is spring-supported, driving means connecting said counter shaft with one pair of truck wheels, a crank shaft journaled on the truck and extending within said crank casing, gears for connecting said crank shaft and said counter shaft, a friction clutch coöperating with said gears, and an engine comprising two sets of horizontal, single acting power cylinders secured to the ends of said crank casing, pistons in said cylinders, and pitmen connecting said pistons with said crank shaft.

WILLIAM F. DAVIS.

Witnesses:
LILLIAN PRENTICE,
HARRY L. CLAPP.